March 24, 1970  H. RODERER  3,502,960
IGNITION CONTROL CIRCUIT HAVING A PHASE SHIFT NETWORK FOR
CONTROLLED RECTIFIERS CONNECTED IN
INVERSE PARALLEL RELATIONSHIP
Filed April 28, 1967  3 Sheets-Sheet 1

INVENTOR.
HERMAN RODERER
BY
Frank R Trifari
AGENT

March 24, 1970  H. RODERER  3,502,960
IGNITION CONTROL CIRCUIT HAVING A PHASE SHIFT NETWORK FOR
CONTROLLED RECTIFIERS CONNECTED IN
INVERSE PARALLEL RELATIONSHIP
Filed April 28, 1967  3 Sheets-Sheet 3

INVENTOR.
HERMANN RODERER
BY
AGENT

United States Patent Office 3,502,960
Patented Mar. 24, 1970

3,502,960
IGNITION CONTROL CIRCUIT HAVING A PHASE SHIFT NETWORK FOR CONTROLLED RECTIFIERS CONNECTED IN INVERSE PARALLEL RELATIONSHIP
Hermann Roderer, Hamburg, Germany, assignor to U.S. Philips Corporation, New York, N.Y., a corporation of Delaware
Filed Apr. 28, 1967, Ser. No. 634,715
Claims priority, application Germany, May 13, 1966, P 39,435
Int. Cl. G05f 3/08
U.S. Cl. 323—24          12 Claims

ABSTRACT OF THE DISCLOSURE

A circuit for controlling the ignition of a pair of controlled rectifiers comprises first and second phase shifting devices which produce first and second voltages in phase opposition, each of which leads the anode voltage of its respective controlled rectifier by 90°. First and second half-wave voltages are produced in the circuit and superimposed on the first and second phase shifted voltages. A source of variable direct voltage is combined therewith to produce first and second control voltages that control a pulse generator, which in turn controls the ignition angle of the controlled rectifiers.

---

The present invention relates to a control circuit for controlled rectifiers and, more particularly, to a control circuit having a 90° phase-shifting member for the vertical or horizontal control of a pair of controlled rectifiers which are energized at their anodes by means of a periodic alternating voltage or by a pulsatory half-wave direct voltage.

In most cases, controlled rectifiers, such as thyratrons, ignitrons and thyristors, are supplied with alternating voltage between their anode and their cathode. As long as a positive anode voltage and a control signal of sufficient amplitude and duration are not applied simultaneously to the rectifier, no current can flow through the rectifier. In order to control the average current flow during the application of a positive anode voltage, a signal that can be shifted with respect to the phase of the anode voltage is applied to the control electrode. The rectifier is ignited at the instant at which the signal intersects the ignition characteristic curve of the rectifier, that is to say when a given threshold value of the control electrode voltage or of the control electrode current, which often also depends upon the anode voltage, is exceeded. Subsequently, the anode current of the rectifier is interrupted, and the rectifier is extinguished, only after it has fallen below a given very low value, for example, when the alternating anode voltage passes through zero. Since the time during which the rectifier is operative is a measure of both the average current and the voltage across the load, the output current and the output voltage of the rectifier, respectively, can be controlled by control of the phase of the initiation of the ignition (phase shift).

Besides other known kinds of control, the vertical control is frequently used for varying the ignition phase of a controlled rectifier since it permits a comparatively accurate adjustment of the fixed ignition instants, while requiring only a small amount of equipment. With the vertical control described, for example, in the book "Thyratrons" by C. M. Swenne, Philips Technical Library, 1961, p. 28, the control electrode of the rectifier is supplied with a sinusoidal alternating voltage which lags by 90° behind the alternating anode voltage and has the same frequency and which is superimposed on a variable direct voltage. By variation of the direct control voltage, the control-electrode alternating voltage, which rises according to a cosine function during the positive half cycle of the anode voltage, can be shifted "vertically" with respect to the ignition voltage of the rectifier so that the ignition phase can be adjusted between 0° and approximately 180°.

The known arrangements for vertical control, using an alternating voltage lagging by 90° and superimposed on a direct voltage, may be used for controlling several thyratrons at a time if said thyratrons have the same cathode potential. In this case, however, separate phase-shifting members must be provided for the phase-shifted alternating control voltages if the alternating anode voltages of the thyratrons are in relative phase opposition; only the direct control voltage can be applied in common. The vertical control of the kind described cannot be used, however, if the anode of the controlled rectifier is supplied with a pulsatory half-wave direct voltage produced, for example, by two-phase half-wave rectification. With such an anode voltage, the second half-wave requires a control voltage which is congruent with the control voltage in the first half-wave, and such a control voltage is not available in the known vertical control.

Furthermore, pulse-control arrangements for controlled rectifiers are known which include a pulse-supplying device, the frequency of these pulses being high with respect to that of the anode voltage. Such a pulse-supplying device has been described, for example, in the information journal "Thyristor-Zündbaustein TTM" of Oct. 21, 1965 of the Valvo G.m.b.H. The pulse-supplying device can be controlled by an alternating control voltage which determines the beginning and the end of pulse trains by means of which the controlled rectifier is ignited. Such a pulse control is referred to as horizontal control since the initiation of the pulses is varied in time (in phase). Such pulse generators may be provided with several relatively independent outputs. If they are to be used for controlling controlled rectifiers the operating voltages of which are relatively independent and the anode voltages of which are in relative phase opposition, or rectifiers operated with two half-waves per cycle, then they must be controlled, as with the vertical control described, by a control voltage having a waveform which is congruent during each half-wave. If the overall control range of 0° to 180° and of 180° to 360°, respectively, is to be covered, the pulse train must be terminated approximately at 180° and at 360°, respectively, in each half-wave, while its beginning must be shiftable between 0° and 180° and between 180° and 360°, respectively.

The invention has for an object to provide a control arrangement of the abovementioned kind in which the disadvantages of the known control arrangements are avoided and which supplies a control voltage which satisfies the said conditions. According to the invention, such a control arrangement is characterized in that phase voltages leading each by approximately 90° (90° and 270°, respectively) and the zero points of which each lie within the voltage range of the original voltages are derived from two sinusoidal alternating voltages (original voltage 0° and 180°, respectively) in relative phase opposition and of the same frequency as the anode voltage, one of which voltages has the same phase (0°) as the anode voltage (0°). Half-wave voltages of substantially the same phases (0° and 180°, respectively) and the same polarities as the original voltages (0° and 180°, respectively) are superimposed on said derived voltages. The two sum voltages are combined by means of diodes connected in the cut-off direction with respect to the sum voltages and a source of variable direct voltage is connected in series with the combined sum voltages.

A preferred embodiment of such a control arrangement is characterized in that all the voltages are derived from the secondary of a transformer having a centre tapping and three pairs of outer winding parts in relative phase opposition, of which the two outermost winding parts each constitute together with an RC-member a phase bridge for producing the phase voltages. The half-wave voltages are each derived between the second outer connection and the junction of two diodes connected in series and in opposition, the junction being connected to the centre tapping through a resistor. A source of variable direct voltage is connected between the junction and one output of the control arrangement. The common junction points of the RC-members are each connected to the other output of the control arrangement through a diode.

Alternatively, the RC-members may each be connected between the zero tapping and the corresponding outer connections or each between the two corresponding outer connections of the secondary of the transformer. In these embodiments, the secondary of each transformer need have only two pairs of outer connections in relative phase opposition.

In an advantageous embodiment, a control arrangement according to the invention may be used for the pulse control of controlled rectifiers by converting the voltage derived from the series-combination of the combined sum voltages and of the variable direct voltage into a square wave voltage, the leading edges of which can be varied in phase by variation of the direct voltage. A pulse generator is controlled by said square-wave voltage for producing trains of pulses of a high repetition frequency with respect to that of the square wave voltage. The pulse generator may have several relatively independent outputs.

The invention will now be described more fully with reference to the drawing, which shows an embodiment of the invention and in which:

FIG. 1 shows a control arrangement for controlled rectifiers (thyristors) which includes a pulse-supplying device which can be excited in the intervals lying between 0° and approximately 180° and between 180° and approximately 360°, respectively, by means of a phase-shift network.

FIGS. 2 and 3 are not drawn to scale.

Figure 1:
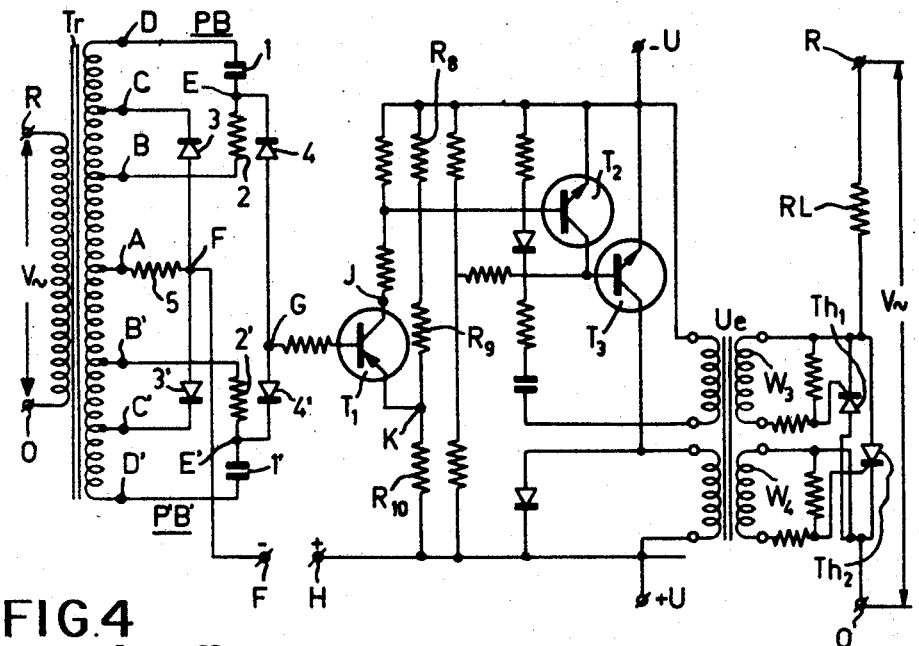

The input voltage RO of a supply transformer $Tr$ of the phase-shift network of FIG. 1 is derived from the same phase R of the current supply lines as the anode supply voltage for two thyristors $Th_1$ and $Th_2$ which are to be controlled. The thyristors are connected in opposite senses to supply a load RL.

The phase-shift network comprises two symmetrical parts supplied from the secondary D–C–B–A–B'–C'–D' of the transformer $Tr$ arranged symmetrically around a centre tapping A. The voltages in one part are invariably in phase opposition to the voltages in the other part. The voltage DB between the two outermost connections is in phase, for example, with the anode voltage of thyristor $Th_1$. The initial phase of the anode voltage of $Th_1$ is assumed to be 0°. The voltage D'B' is in phase with the anode voltage of thyristor $Th_2$ (phase 180°).

The windings D–C–B and D'–C'–B', respectively, constitute together with RC members 1,2 and 1',2', respectively, phase bridges PB and P'B', respectively. The output voltages EC and E'C' of the phase bridges each lead by 90° with respect to the original voltages DB and D'B', respectively, in the manner shown in the vector diagram of FIG. 2. The voltage EC has a phase of 90° and the voltage E'C' has a phase of 270° (cf. also FIGS. 3a and 3c). The voltages at the zero points C and C', respectively, of said windings lie in the range of the original voltages DB and D'B', respectively.

On the phase voltages EC and E'C', respectively, are superimposed half-wave voltages which are derived between the tapping points C and C', and the junction F of two diodes 3 and 3' connected in opposite senses between said tapping points. The diodes 3 and 3' are connected so that they remain non-conducting for each half-wave at the points C and C'. The point F has no fixed potential. If point C is positive, point F coincides with point C' except for the residual voltage of the conducting diode 3', and conversely (cf. FIG. 2). The current connection between points F and A is established by a resistor 5.

Figure 3A:
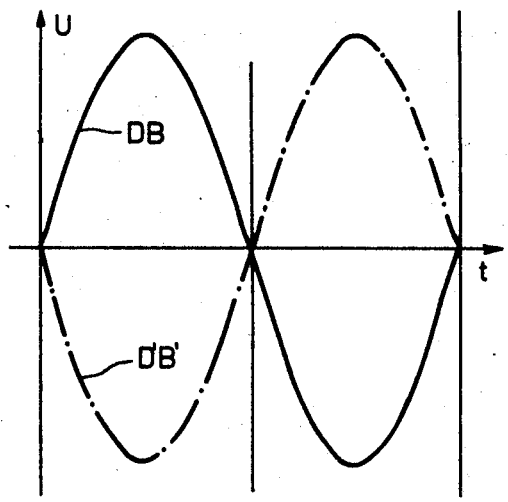
FIG. 3 illustrates the voltages between various points of said network.
Figure 3B:
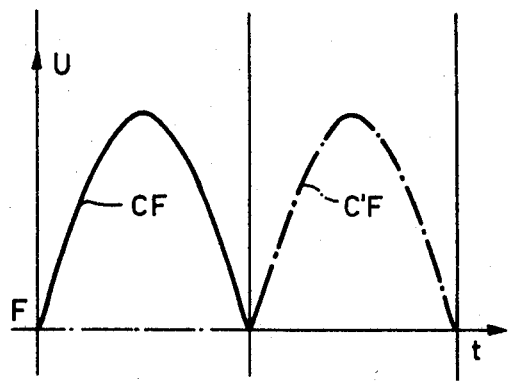

The phase relations and polarities of the half-wave voltages CF and C'F are shown in FIG. 3b. Voltage CF has the same phase and the same voltage polarity as the voltage DB, whereas waveform C'F' has the same phase and voltage polarity as the waveform D'B'.

Figure 3C:
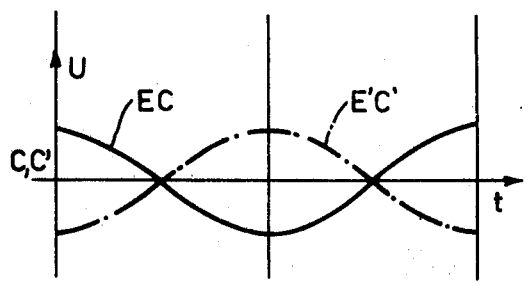
Figure 3D:
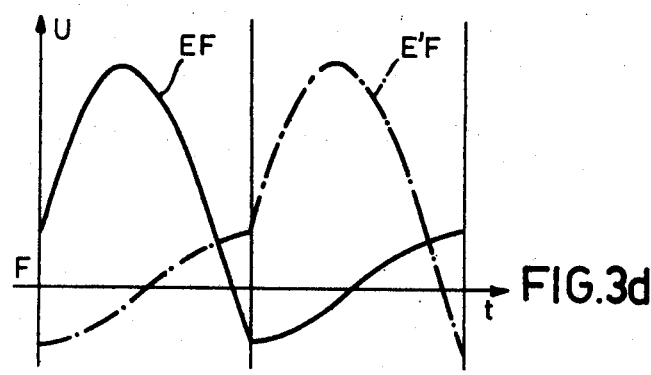

FIG. 3d shows the respective sum voltages EF and E'F produced by superimposing the voltages EC and CF and E'C' and C'F, respectively.

The sum voltages EF and E'F are combined through two diodes 4 and 4' which are cut off for the relevant sum voltage. The resultant voltage GF is shown in FIG. 3e.

Figure 3E:
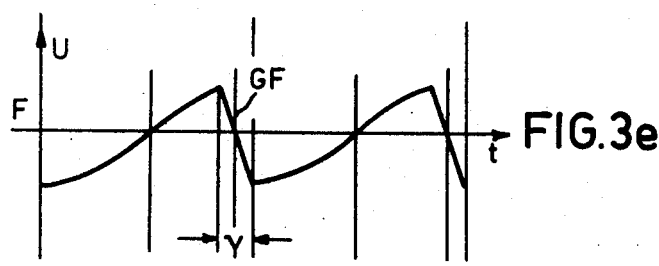

The voltage GF is superimposed on the direct control voltage FH required for the adjustment of the ignition angle, so that in the diagram of FIG. 3e, the voltage GF can be shifted with respect to the zero line.

Figure 4:
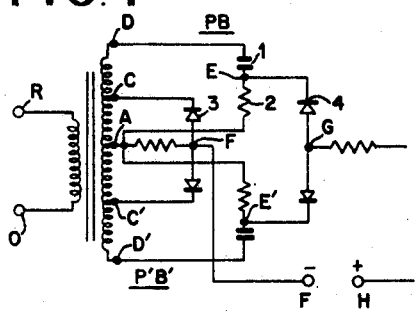
FIGS. 4 and 5 show alternative phase shift networks.
Figure 2:
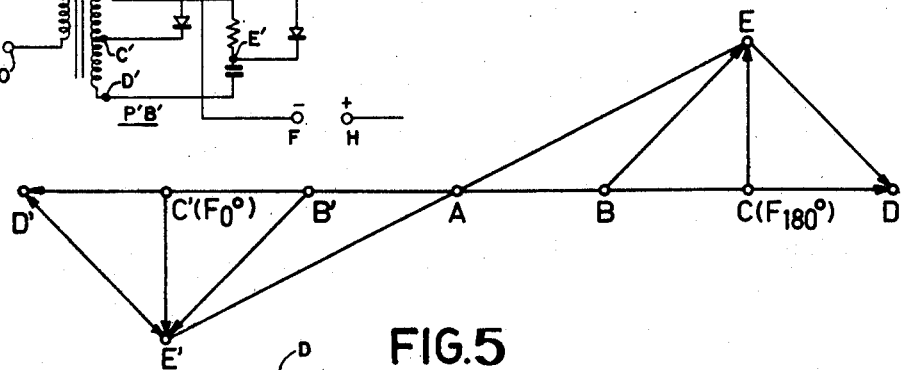
FIG. 2 shows the vector diagram of the voltages in the phase-shift network in the lefthand part of FIG.1.
Figure 5:
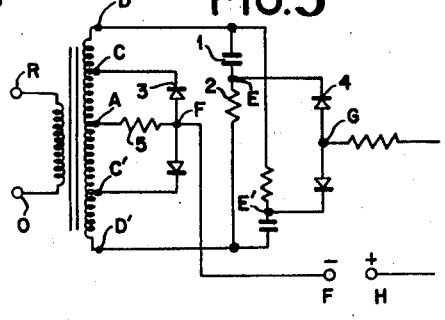

It is apparent from the vector diagram of FIG. 2 that the original voltages may also be derived between the points D and A or D and D' and between D' and A or D' and D. The tapping points B and B' are then omitted as shown in FIGS. 4 and 5. The values of the resistors 2 and 2' of the phase bridges PB and P'B', respectively, must be increased accordingly. Since the internal resistance of the phase-shift network is also determined by the said resistors, it may therefore be efficacious to use the circuit arrangement shown in FIG. 1.

In each half cycle of the supply voltage, the output voltage GH of the phase-shift network varies congruently in accordance with an ascending cosine function so that it is capable of igniting controlled rectifiers, for example, thyratrons or thyristors, in an ignition angle range of 0° to approximately 180° and from 180° to approximately 360°, respectively, in both half cycles. The ignition phase angle may be shifted by variations of the direct control voltage FH. If an ignition voltage of negative polarity is required, it is sufficient to interchange the connections G and H.

The approximation of the ignition phase angle to 180° and to 360°, respectively, is limited by the angle $\gamma$ (FIG. 3e) which may be kept small, however, by suitable proportioning.

The right hand part of FIG. 1 shows a pulse-supplying device for the horizontal control of thyristors $Th1$ and $Th2$, which are connected in parallel opposition between a load and the current supply R0. This device has an input stage including a transistor T1 biassed by means of a voltage divider R8, R9, R10. In this stage, the voltage GH is converted to a square wave voltage JK (FIG. 3f) by driving the transistor into the saturated state. The leading edges V and V' of the negative pulses can be shifted in phase from 0° to approximately 180° by variation of the direct control voltage FH.

Figure 3F:
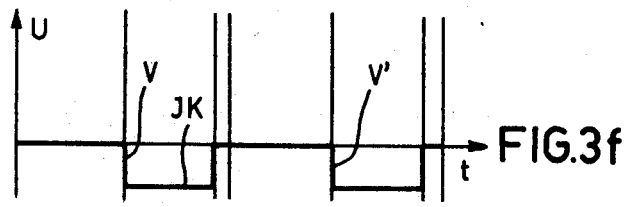

For the square wave voltage JK in FIG. 3f, the direct control voltage FH is assumed to have a value such that the leading edges V and V' are located at the zero passages of the voltage GF. If, by variation of the direct control voltage FH, the curve GF is shifted with respect to the zero line to negative values (in the figure, in the downward direction), transistor T1 is now cut off at a larger phase angle and the edges V and V' are shifted accordingly to the right in FIG. 3f. Thus, the negative pulses become narrower. The leading edges V and V' are shifted in a corresponding manner to smaller phase angles if the curve GF is shifted to more positive values.

Figure 3G:
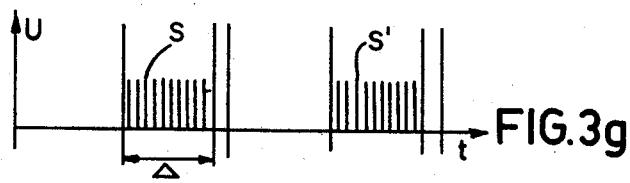

A pulse generator stage employing transistors T2 and T3 is controlled by the square wave voltage JK in a manner such that it can oscillate during the negative square wave pulse of the voltage JK. The pulse stage supplies control pulses S and S' for the thyristors Th1 and Th2, respectively, via two output windings W3 and W4 of an output transformer U. The latter windings are isolated from each other for direct currents. The pulse frequency of the control pulses is considerably higher than the supply frequency, for example, by 2 kc./s. (cf. FIG. 3g). The pulse duration Δ is sufficiently long so that a safe ignition of the thyristors is guaranteed.

What is claimed is:

1. A control circuit for alternately igniting a pair of controlled rectifiers coupled to a load comprising, a source of periodic voltage of a given frequency coupled to the anodes of said controlled rectifiers, a source of AC voltage of said given frequency, first and second 90° phase-shifting networks coupled to said AC voltage source to derive first and second alternating control voltages in phase opposition, means coupled to said AC voltage source for deriving first and second half-wave rectified voltages in phase opposition, one of said half-wave voltages being in phase with said AC voltage, means for combining said control voltages and said half-wave voltages to produce third and fourth alternating control voltages, a source of adjustable direct voltage, first and second means including said first and second diodes for combining said third and fourth control voltages and said adjustable direct voltage to produce a time varying voltage adapted to control the ignition of the controlled rectifiers.

2. A control circuit as claimed in claim 1 wherein said AC voltage source comprises a transformer having a center tapped secondary winding and three pairs of outer winding sections in relative phase opposition, and wherein said first and second phase-shifting networks comprise first and second RC networks coupled to the respective two outermost winding sections of said secondary winding to form therewith first and second phase bridge networks.

3. A control circuit as claimed in claim 2 wherein the means for deriving said half-wave rectified voltages comprises, a resistor connected at one end to said center tap, third and fourth diodes connected in series opposition across the respective second outer winding sections, and means connecting the other end of said resistor to the junction of said third and fourth diodes, said first and second half-wave rectified voltages being produced between the respective second outer winding sections and said junction of the third and fourth diodes.

4. A control circuit as claimed in claim 3 further comprising means connecting said source of adjustable direct voltage between said diode junction and one output of the control circuit, and means connecting the common junction points of each of said RC networks to the other output of said control circuit via said first and second diodes, respectively.

5. A control circuit as claimed in claim 1 wherein said AC voltage source comprises a transformer having a center tapped secondary winding and a primary winding coupled to said periodic voltage source, said periodic voltage source supplying a sinusoidal AC voltage, and wherein said first and second phase-shifting networks comprise first and second series RC networks each connected between said center tap and corresponding outer taps on said secondary of opposite polarity.

6. A control circuit as claimed in claim 1 wherein said AC voltage source comprises a transformer having a center tapped secondary winding and a primary winding coupled to said periodic voltage source, said periodic voltage source supplying a sinusoidal AC voltage, and wherein said first and second phase-shifting networks comprise first and second series RC networks connected across two corresponding outer taps on said secondary winding.

7. A control circuit as claimed in claim 1 further comprising means for converting said time varying voltage into a square wave voltage, the leading edge of said square wave voltage being varied in phase by variation of said direct voltage, and a pulse generator controlled by said square wave voltage for producing a sequence of pulses having a high repetition frequency relative to the frequency of said square wave voltage.

8. A circuit for controlling the ignition of a pair of controlled rectifiers coupled to a load comprising, means for supplying an AC voltage to the anodes of said controlled rectifiers, first and second phase-shifting networks coupled to said AC voltage supply means for producing first and second AC voltages in phase opposition, each of said first and second AC voltages leading the anode voltage of its respective controlled rectifier by 90°, rectifier means coupled to said AC voltage supply means for deriving first and second half-wave voltages in phase opposition that are superimposed on said first and second phase shifted AC voltages, respectively, to produce third and fourth alternating control voltages, a source of variable direct voltage, first and second diodes, and means including said first and second diodes for combining said third and fourth control voltages with said variable direct voltage to produce a time varying voltage adapted to control the control electrodes of the controlled rectifiers to adjust the ignition period thereof.

9. A control circuit as claimed in claim 8 wherein said first and second half-wave voltages are in phase with the anode voltages of their respective controlled rectifiers and said source of direct voltage is connected in series with said third and fourth control voltages.

10. A control circuit as claimed in claim 8 further comprising means for converting said time varying voltage into a square wave voltage of a frequency that is harmonically related to the frequency of said AC voltage, the width of said square wave voltage being variable as a function of said direct voltage, and a pulse generator controlled by said square wave voltage for producing periodic sequences of pulses having a high repetition frequency relative to the frequency of said square wave voltage.

11. A control circuit as claimed in claim 8 wherein said rectifier means are coupled to said AC voltage supply means so that said first and second half-wave voltages are in phase with the anode voltages of respective ones of said controlled rectifiers, said time varying voltage exhibiting a waveform substantially as shown in FIG. 3e of the drawing.

12. A control circuit for alternately igniting a pair of controlled rectifiers connected in inverse-parallel relationship comprising, a source of AC voltage coupled to the anodes of said controlled rectifiers, and a phase-shift network comprising, a transformer having a primary winding coupled to said AC voltage source and a center tapped secondary winding having first and second winding sections in phase opposition, first and second series connected RC circuits connected across corresponding first parts of said first and second winding sections, a resistor, first and second diodes, means connecting said resistor in series with said first and second diodes between said center tap and corresponding taps on said first parts of said first and second winding sections, respectively, third and fourth diodes connected in series opposition between corresponding junction points on said first and second RC circuits, and a source of variable direct voltage connected between the junction of said first and second diodes and the junction of said third and fourth diodes.

References Cited

UNITED STATES PATENTS

| | | | |
|---|---|---|---|
| 2,681,428 | 6/1954 | Rockafellow | 323—122 X |
| 2,887,648 | 5/1959 | Kubler | 323—121 X |
| 3,128,422 | 4/1964 | Brown. | |
| 3,243,711 | 3/1966 | King et al. | |

LEE T. HIX, Primary Examiner

A. D. PELLINEN, Assistant Examiner

U.S. Cl. X.R.

323—36, 122